US005231390A

United States Patent [19]

Mittel

[11] Patent Number: 5,231,390

[45] Date of Patent: Jul. 27, 1993

[54] SELECTIVE CALL RECEIVER WITH DECODER CONTROLLED FILTERS

[75] Inventor: James G. Mittel, Boynton Beach, Fla.

[73] Assignee: Motorola, Inc., Schaumburg, Ill.

[21] Appl. No.: 860,280

[22] Filed: Apr. 1, 1992

Related U.S. Application Data

[63] Continuation of Ser. No. 601,979, Oct. 22, 1990, abandoned.

[51] Int. Cl.$^5$ .............................................. H04Q 1/00

[52] U.S. Cl. ........................... 340/825.44; 455/182.1; 455/182.3

[58] Field of Search ...................... 340/825.44, 825.71; 455/182.1, 182.2, 182.3, 307, 200.1, 266, 340

[56] References Cited

U.S. PATENT DOCUMENTS

| | | | |
|---|---|---|---|
| 3,626,311 | 12/1971 | Kraybill | 340/825.44 |
| 4,045,740 | 8/1977 | Baker | 455/340 |
| 4,281,348 | 7/1981 | Shizuya | 455/307 |
| 4,422,178 | 12/1983 | Mori | 340/825.44 |
| 4,472,685 | 9/1984 | Dutasta | 455/340 |
| 4,598,422 | 7/1986 | Fellman | 455/182 |

*Primary Examiner*—Donald J. Yusko
*Assistant Examiner*—Brian Zimmerman
*Attorney, Agent, or Firm*—Keith A. Chanroo; William E. Koch; Thomas G. Berry

[57] ABSTRACT

A selective call receiver (100) includes a receiver (1104) for receiving a signal. The receiver (104) includes a controlled filter (142) having a variable frequency response. A decoder (106) coupled to the controlled filter (142) of the receiver (104) decodes the received signal. The decoder (106) has a decoder clock for generating a decoder clock signal (122). A controlled oscillator (134) has an input filter (136) controlled by a control signal (132). The controlled oscillator (134) generates an output signal (140) in response to the control signal (132) for coupling to a comparator (124) which generates the control signal (126) from the decoder clock signal (122) and the output signal (140). The control signal (126) is further coupled to the controlled filter(142) for controlling the frequency response of the controlled filter (142) which filters the received signal.

7 Claims, 4 Drawing Sheets

SELECTIVE CALL RECEIVER WITH DECODER CONTROLLED FILTERS

This is a continuation of application Ser. No. 07/601,979, filed Oct. 22, 1990 now abandoned.

FIELD OF THE INVENTION

This invention relates in general to controlled filters, and more specifically to a selective call receiver with decoder controlled filters.

BACKGROUND OF THE INVENTION

Conventional selective call receivers (e.g., paging receivers) typically use ceramic resonator filters to generate most of the receiver's adjacent channel selectivity. Ceramic filters used in selective call receivers normally have a center frequency of 455 kHz with a design tolerance of plus-or-minus 1 kHz, and an additional plus-or-minus 1 kHz variation over temperature. However, recent advances in integrated circuit (IC) technology make it possible to integrate these filters. Integrated filters are commonly fabricated using a gyrator based implementation of a coupled resonator bandpass filter as is known to those skilled in the art. FIG. 1 illustrates a transconductance amplifier. The well known relation of the transconductance of an amplifier to its bias current is given by:

$$G = \mathrm{Iout}/\mathrm{Vin} = \tfrac{I}{2}\mathrm{Vt}$$

where:

I=the amplifier DC bias current; and

Vt=KT/Q where:

K=Boltzman's constant;

T=absolute temperature; and

Q=charge on an electron. From these equations, it will be apparent to those skilled in the art that the bias current I of the amplifier must be precisely generated and controlled to ensure consistent operation over a wide temperature range (−10 degrees C. to 50 degrees C.). As is known, bias current is the DC current required to set the filter to its desired frequency. Currently, bias current control is achieved by trimming components of the integrated circuit to eliminate large tolerance variations that are common in typical IC processing. Also, additional temperature compensation is necessary in conventional ICs to further restrict the variation that typically occur over the IC's operating temperature range.

Thus, what is needed is a technique that eliminates the trimming requirement of wide variation component parameters over the opening temperature range of the IC.

SUMMARY OF THE INVENTION

Briefly, according to the invention, a selective call receiver comprises a receiving means for receiving a signal. The receiving means includes a controlled filter having a variable frequency response. A decoder means coupled to the controller filter of the receiving means decodes the received signal. The decoder means has a decoder clock for generating a decoder clock signal. A controlled oscillator has an input filter controlled by a control signal. The controlled oscillator generates an output signal in response to the control signal for coupling to a comparing means which generates the control signal from the decoder clock signal and the output signal. The control signal is further coupled to the controlled filter for controlling the frequency response of the controlled filter which filters the received signal.

DESCRIPTION OF A PREFERRED EMBODIMENT

Figure 1:
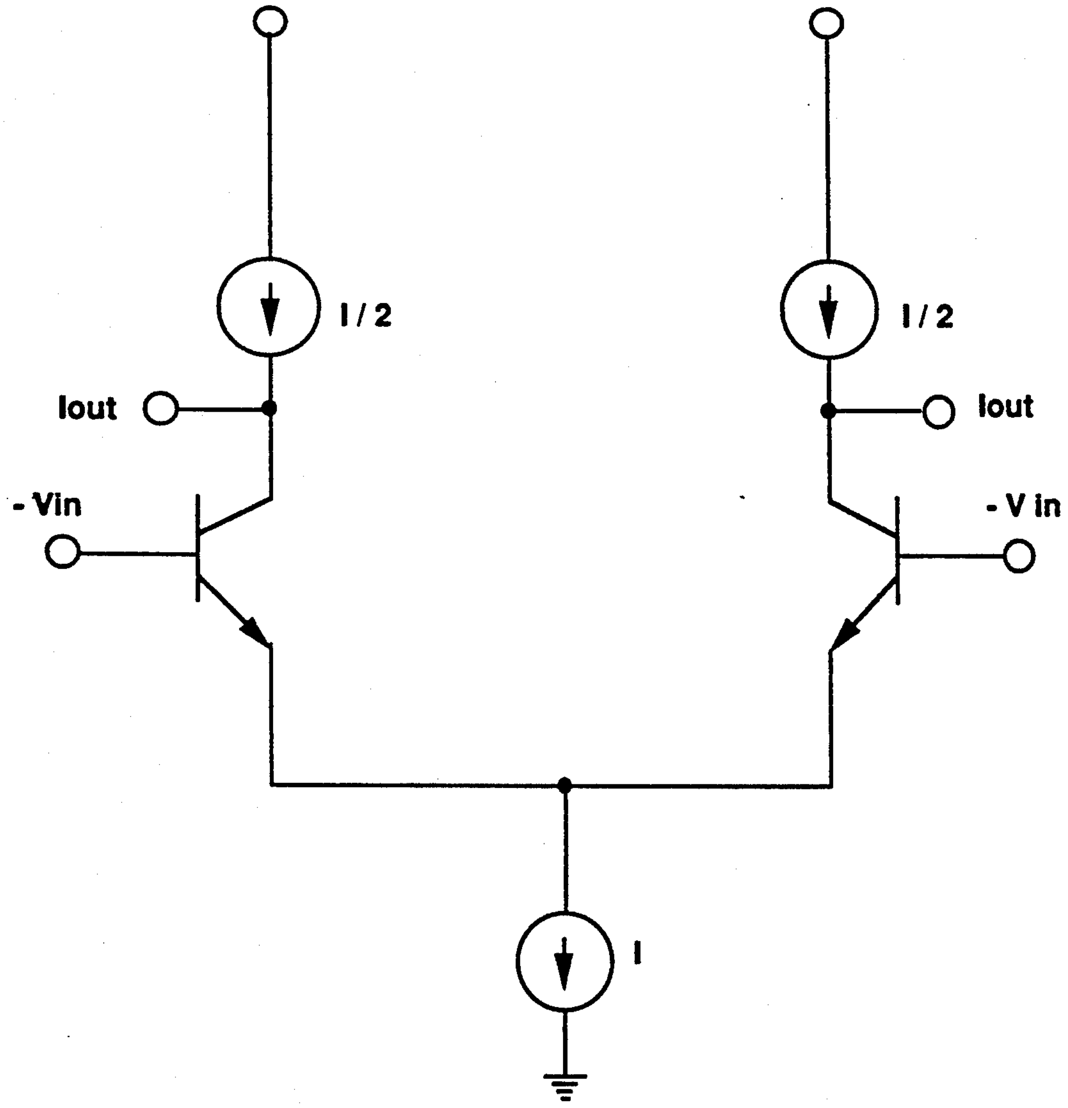
PRIOR ART FIG. 1
FIG. 1 is schematic diagram of a typical transconductance amplifier.
Figure 2:
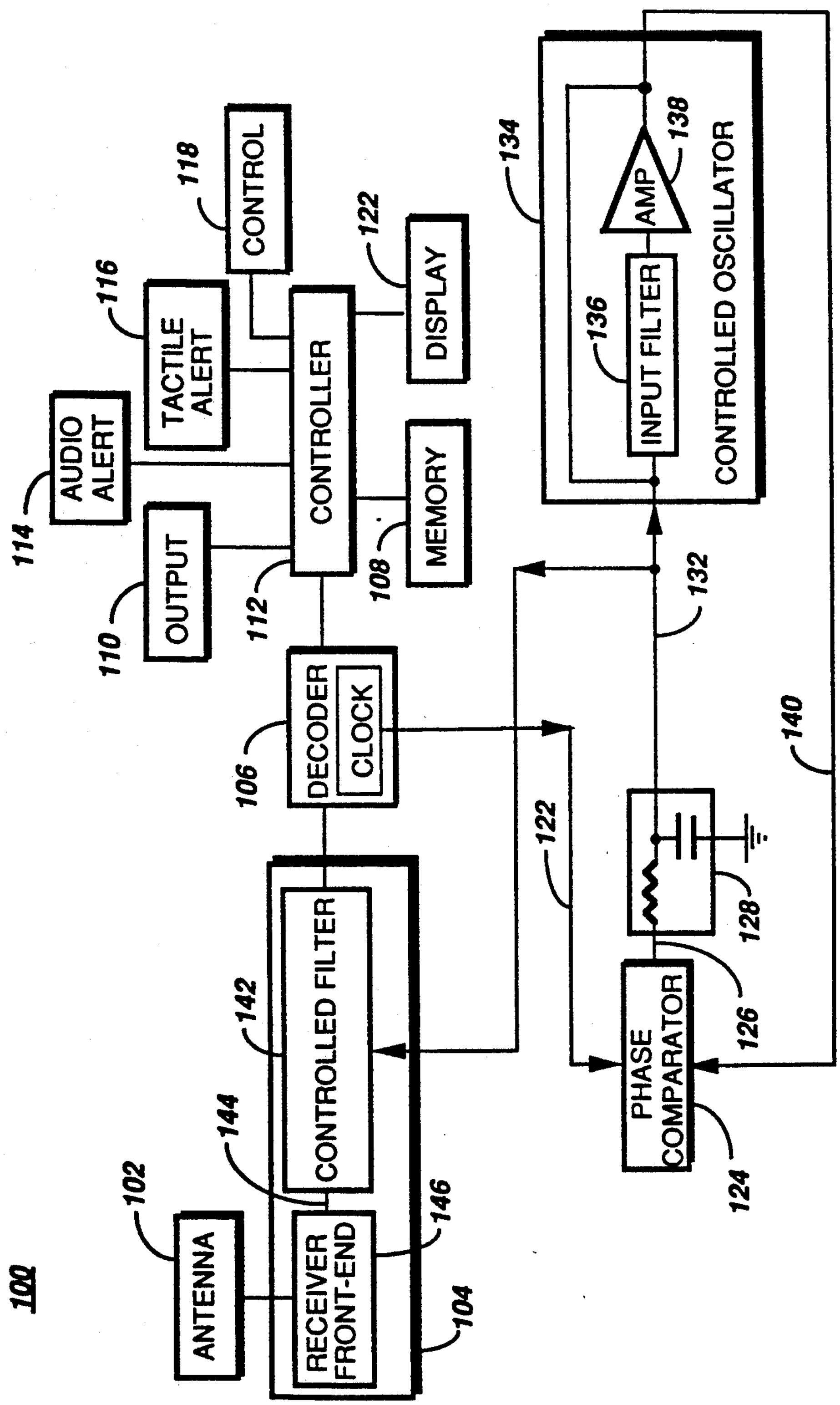
FIG. 2 is a block diagram of a selective call receiver in accordance with the present invention.

Referring to FIG. 2, a selective call radio receiver 100 (e.g., a pager) comprises an antenna 102 that provides an RF carrier signal that is mixed with a local oscillator signal contained within a receiver module 104. The receiver module 104 includes a receiver front-end 146 which is known to those skilled in the arts and a controlled filter 142 to be hereafter further discussed. The receiver 104 generates a recovered signal suitable for processing by a decoder 106 in a manner well known to those skilled in the art. The decoder 106 converts the signal to an address. A controller 112 compares the decoded address with one or more predetermined addresses contained in a memory 108. When the addresses are substantially similar, the user is alerted that a signal has been received either by an audio alert (e.g., speaker) 114 or a tactile alert (e.g., vibrator) 116. The received signal may also include optional message data directed to some selective call receivers. Also, if the selective call receiver includes an optional voice output, recovered audio components of the received R.F. signal may be represented on the output module 110. For a message or a voice selective call receiver, the recovered message or voice output is stored in a memory 108 for subsequent presentation by an display module 120. The display module 120 will automatically, or when manually selected by controls 118, presents the message, such as by displaying the message on a display.

According to the invention, a reference signal 122 from the decoder 106 comprises a decoder clock signal 122, which, together with an output signal 140, are compared by a phase comparator 124. A phase difference between these signals generates an error signal 126 that is processed by a loop filter 128 to produce a control signal 132. The control signal 132 drives a controlled oscillator 134 that includes an input filter 136, and an amplifier 138.

Figure 3:
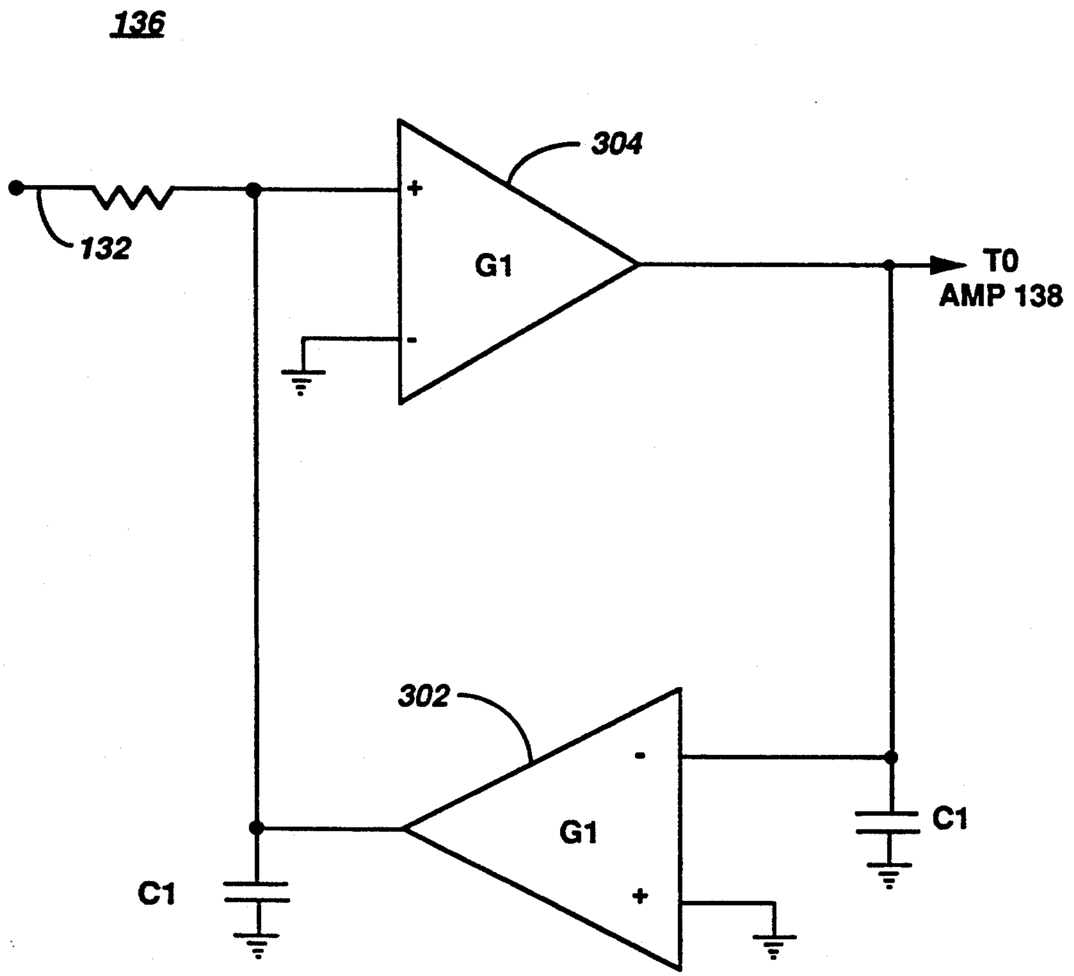
FIG. 3 is a block diagram of a bandpass filter in accordance with the present invention.

Referring to FIG. 3, amplifiers 302, 304 are matched (i.e., substantially the same transconductance G1). Two capacitors labeled C1 are selected to such that when the input filter 136 is provided with a zero phase shift signal the oscillator will oscillate at the frequency of the reference signal 122.

Referring again to FIG. 2, the controlled oscillator 134 includes an amplifier 138 that amplifies a signal from the input filter 136 to reach the required level to maintain. A feedback loop within the controlled oscillator 134 ensures that the controlled oscillator 134 oscillates without substantial variation in its operating frequency. The output signal 140 of the oscillator 139 is fed back to the phase comparator 124, which generates an error signal 126 to ensure that the output signal 140 is substantially equal to the reference signal 122. In this way, the controlled oscillator 134 will oscillate at the frequency of the reference signal 122. The feedback loop ensures that any variation between the reference signal 122 and the output signal 140 is corrected. This eliminates the need to trim the component values and the need for temperature compensators, because the variation due to operating temperature is minimized. The close tolerance of the reference oscillator is due to its crystal bias and may be synthesized.

Still referring to FIG. 2, the controlled filter 142 receives a signal 144, which preferably comprises an IF signal from the receiver front-end 146 may have a frequency substantially larger than the frequency of the reference signal 122. The controlled filter 142 is controlled by the control signal 132 to vary the frequency response by varying parameters, for example, the transconductance of the controlled filter 142. The center frequency Wo of the filter given by:

$$Wo=G/C$$

where:

G is the transconductance of the amplifier; and

C is the nodal capacitance (not shown).

The controlled filter 142 is preferably similar in structure to the input filter 136 shown in FIG. 3, except that the amplifiers have a transconductance G2 and the capacitors have a capacitance C2. Those skilled in the arts will appreciate that by selecting the G2 and C2, the controlled filter 142 may be set to a different frequency. The capacitance (or a varactor not shown) of the controlled filter 142 is selected to produce a desired ratio of frequency response between the input filter 136 and the controlled filter 142. The transconductance parameter of the controlled filter 142 is similarly chosen, but its value is varied by the control signal 132 to maintain the desired frequency response. The input filter 136 is maintained precisely on frequency because the decoder clock signal (reference signal 122) is driven by an accurate clock within the decoder 106 (not shown). Preferably, the frequency of the controlled filter 142 is set between the harmonics of the reference signal 122 to avoid desensitizing the receiver 104. For example:

assuming the frequency of the reference signal (122)=38.4 kHz;

G2/G1=4; and

C2/C1=40/36,

The center frequency of the controlled filter 142 is preferably set to 138.24 kHz. In this way, the frequency response of the controlled filter 142 will be set between the harmonic interferences generated from the reference signal 122, thus preventing desensitization of the receiver 104.

In summary, a selective call receiver includes a controlled oscillator that generates an output signal from a received signal. The controlled oscillator has an input filter that is controlled by a control signal generated from a reference signal. The output signal and the reference signal, generated from the received signal, are used to adjust the output of the controlled oscillator to equal the reference signal. The control signal controls a controlled filter that filters a second signal. In this way, the need for trimming the component values are eliminated and the variation due to operating temperature is minimized, thereby eliminating the need for temperature compensators.

Figure 4:
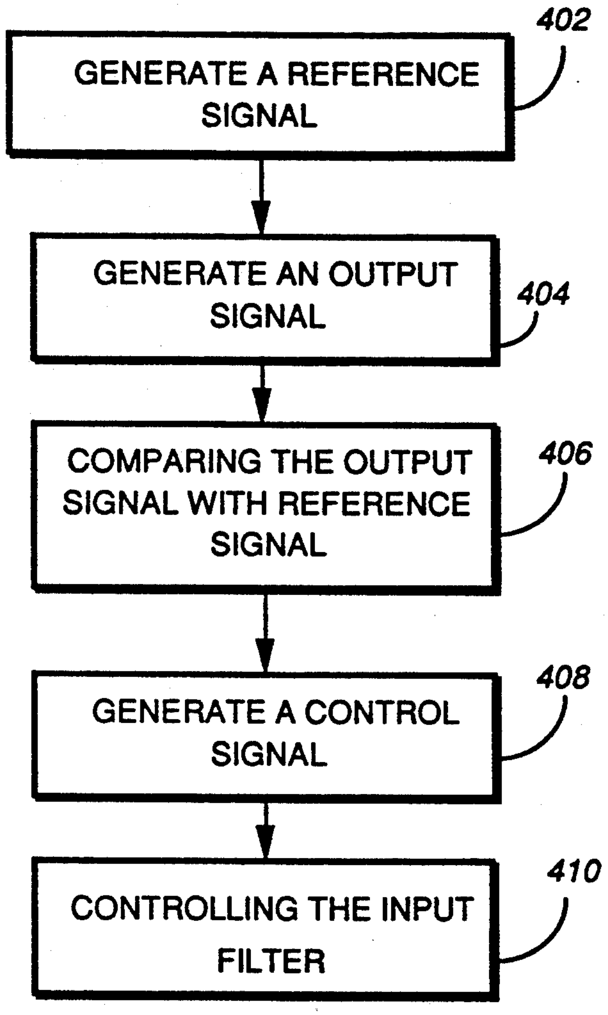
FIG. 4 is a flow diagram illustrating the operation of the preferred embodiment of the invention according to FIG. 2.

Reference to FIG. 4, a method for controlling a filter from a decoder signal is illustrated. A reference signal 122 is generated at step 402, and an output signal 132 is generated at step 404. The output signal 132 and the reference signal 122 are compared at step 406. The comparison (at step 406) generates a control signal 132 (step 408) which is used to control the input filter 136. In this way, the input filter is adjusted by making a comparison of the output signal 132 and the reference signal 122, this comparison generates the control signal which directly controls the input filter to adjust the output signal. Furthermore, because the controlled filter and the input filter are controlled by the control signal, the frequency response of the controlled filter varies with the frequency response of the input filter. In this way, the frequency response of the controlled filter will be set between the harmonic interferences generated from the reference signal, thus preventing desensitization of the receiver 104.

I claim:

1. A selective call receiver, comprising:

receiving means for receiving a signal, said receiving means including a controlled filter having a variable frequency response;

decoder means coupled to the controlled filter of said receiving means for decoding the received signal, said decoder means having a decoder clock for generating a decoder cock signal; and a controlled oscillator having an input filter controlled by a control signal, the controlled oscillator generating an output signal in response to the control signal for coupling to a comparing means which generates the control signal from the decoder clock signal and the output signal, the control signal is further coupled to the controlled filter for controlling the frequency response of the controlled filter for filtering the received signal.

2. The selective call receiver according to claim 1 wherein the comparing means comparing the output signal with the decoder clock signal for generating an error signal.

3. The selective call receiver according to claim 2 further comprises a loop filter for generating the control signal in response to the error signal.

4. The selective call receiver according to claim 1 wherein the frequency of the input filter is substantially lower than the frequency of the controlled filter.

5. The selective call receiver according to claim 1 wherein the output of the input filter is substantially equal to the decoder clock signal.

6. A method for controlling a controlled filter from a decoder clock signal for filtering a received signal, comprising the steps of:

(a) filtering the received signal with the controlled filter;

(b) generating an output signal in response to the decoder clock signal;

(c) comparing the decoder clock signal and the output signal to generate a control signal;

(d) controlling the frequency response of the controlled filter with the control signal for filtering the received signal.

7. A selective call receiver comprising:

receiving means for receiving a signal, the receiving means including a controlled filter having a variable frequency response;

decoder means coupled to the receiving means for decoding the received signal, said decoder means including a decoder clock for generating a decoder clock signal independent of the received signal;
a phase comparator means coupled to the decoder means for generating a control signal in response to the decoder clock signal;
a controlled oscillator, coupled to the phase comparator, having an input filter controlled by the control signal, the controlled oscillator generating an output signal in response to the control signal, the control signal is further coupled to the controlled filter of the receiving means for controlling the frequency response of the controlled filter for filtering the received signal;
means for comparing the output signal to the decoder clock signal for producing an error signal; and
means for processing the error signal for generating the control signal for controlling the controlled filter and the controlled oscillator.

* * * * *